United States Patent
Nemesh

(10) Patent No.: US 9,522,589 B2
(45) Date of Patent: Dec. 20, 2016

(54) VEHICULAR HEAT PUMP SYSTEM AND CONTROL METHOD

(71) Applicant: GM GLOBAL TECHNOLOGY OPERATIONS LLC, Detroit, MI (US)

(72) Inventor: Mark D. Nemesh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 813 days.

(21) Appl. No.: 13/645,749

(22) Filed: Oct. 5, 2012

(65) Prior Publication Data

US 2014/0096549 A1   Apr. 10, 2014

(51) Int. Cl.
| | | |
|---|---|---|
| F25B 30/00 | (2006.01) |
| B60H 1/32 | (2006.01) |
| B60H 1/00 | (2006.01) |
| F25B 13/00 | (2006.01) |

(Continued)

(52) U.S. Cl.
CPC .......... B60H 1/323 (2013.01); B60H 1/00885 (2013.01); B60H 1/00899 (2013.01); B60H 1/3205 (2013.01); B60H 1/00907 (2013.01); F25B 13/00 (2013.01); F25B 29/003 (2013.01); F25B 30/02 (2013.01)

(58) Field of Classification Search
CPC ........... B60H 1/00007; B60H 1/00642; B60H 1/00878; B60H 1/00885; B60H 1/00899; B60H 1/00907; B60H 1/00928; B60H 1/00942; B60H 1/00949; B60H 1/3205; F25B 13/00; F25B 29/00; F25B 29/003; F25B 30/00; F25B 30/02
USPC ...... 62/56, 79, 115, 129, 159, 160, 198–200
See application file for complete search history.

(56) References Cited

U.S. PATENT DOCUMENTS

| | | | | |
|---|---|---|---|---|
| 5,598,887 A | * | 2/1997 | Ikeda ................. | B60H 1/00392 165/202 |
| 2002/0035843 A1 | * | 3/2002 | Kampf ............................ | 62/231 |
| 2008/0314071 A1 | | 12/2008 | Ohta et al. | |

(Continued)

FOREIGN PATENT DOCUMENTS

| | | |
|---|---|---|
| CN | 2378670 Y | 5/2000 |
| CN | 200955881 Y | 10/2007 |

(Continued)

OTHER PUBLICATIONS

Machine Translation for JP2003-166772.*

*Primary Examiner* — Ryan J Walters
*Assistant Examiner* — Antonio R Febles
(74) *Attorney, Agent, or Firm* — Quinn Law Group, PLLC

(57) ABSTRACT

A vehicular heat pump system may have two inside heat exchangers within an HVAC module, and may operate in mild cooling and mild heating modes. In mild cooling mode, a first isolation valve and a second isolation valve are fully open and closed, respectively, to direct the refrigerant flow to the first inside heat exchanger only. In mild heating mode, the first isolation valve and the second isolation valve are fully closed and fully open, respectively, to direct the refrigerant flow to the second inside heat exchanger only. In both modes, a first metering device is partially open to control the flow and expansion of the refrigerant, and a second metering device is fully closed to prevent the refrigerant from flowing between the inside heat exchangers. This staged operation of the heat pump system may reduce the risk of flash fog as well as reduce discharge air temperature spreads.

14 Claims, 2 Drawing Sheets

(51) Int. Cl.
*F25B 29/00* (2006.01)
*F25B 30/02* (2006.01)

(56) References Cited

U.S. PATENT DOCUMENTS

2009/0095005 A1* 4/2009 Dietrich et al. ............... 62/244
2012/0085114 A1  4/2012 Graaf et al.

FOREIGN PATENT DOCUMENTS

| CN | 102563943 A | | 7/2012 | |
|---|---|---|---|---|
| DE | 102009048674 A1 | | 5/2010 | |
| EP | 1757875 A2 | | 2/2007 | |
| JP | 5888563 A | | 5/1983 | |
| JP | 2003166772 A | * | 6/2003 | ............. F25B 29/00 |
| JP | 2007057142 A | | 3/2007 | |

* cited by examiner

VEHICULAR HEAT PUMP SYSTEM AND CONTROL METHOD

TECHNICAL FIELD

The present invention relates to a vehicular heat pump system, and a method of staged-control of multiple refrigerant heat exchangers located within an HVAC module of the vehicular heat pump system.

BACKGROUND

Automotive vehicles have implemented heat pump type air conditioning and heating systems to provide both cooling and heating to the passenger compartment of the vehicles. Such systems may include an outside heat exchanger, an inside heat exchanger located inside an HVAC module, a compressor, and a four-way, reversing valve for changing the direction of the refrigerant flow to and from the compressor when switching from cooling mode to heating mode, or vice versa. In some systems, there may be two inside heat exchangers located inside the HVAC module where they may be configured to selectively operate in parallel and/or in series. The systems also may include other devices as well, including, but not limited to, metering devices, valves, fans, and blowers.

In cooling mode, the inside heat exchanger(s) acts as a heat absorber, or an evaporator, and the outside heat exchanger acts as a heat radiator, or a condenser. The refrigerant flows from the compressor through the outside heat exchanger, into a metering device, such as a thermal expansion valve (TXV), and then through the inside heat exchanger(s). Heat is extracted from the air blown across the inside heat exchanger(s), thereby providing cooled air to the passenger compartment.

In heating mode, the outside heat exchanger acts as the evaporator, and the inside heat exchanger(s) acts as the condenser. The reversing valve reverses the flow of the refrigerant such that it flows from the compressor through the inside heat exchanger(s), into a metering device, and then through the outside heat exchanger. Heat from the refrigerant is rejected by the air blown across the inside heat exchanger(s), thereby providing heat to the passenger compartment.

When the inside heat exchanger(s) is used first as an evaporator, and subsequently is used as a condenser, as when switching from a cooling mode to a heating mode, flash fog may occur within the passenger compartment. This occurs when condensate left on the inside heat exchanger(s) from the cooling operation rapidly evaporates or flashes when the inside heat exchanger(s) becomes warm or hot. Some vehicular heat pump systems may implement and run an HVAC module blower in an attempt to dry off the condensate when the vehicle is shut off.

SUMMARY

A vehicular heat pump system having multiple heat exchangers within an HVAC module is provided. The vehicular heat pump system includes a refrigeration circuit in which refrigeration is circulated, and at least one controller. The refrigeration circuit includes an outside heat exchanger, a first inside heat exchanger, and a second inside heat exchanger. Each heat exchanger is configured to selectively operate as a condenser or an evaporator. Generally, when the outside heat exchanger is operating as a condenser, the inside heat exchangers will operate as evaporators. Similarly, when the outside heat exchanger is operating as an evaporator, the inside heat exchangers will operate as condensers.

The refrigeration circuit also includes a compressor configured to compress the refrigerant, and an HVAC module in which the first inside heat exchanger and the second inside heat exchanger are located. The refrigeration circuit further includes a first isolation valve, a second isolation valve, a first metering device, and a second metering device. The isolation valves are configured to isolate one of the first inside heat exchanger and the second inside heat exchanger, depending on the mode of operation as determined by the controller. The metering devices are configured to control the flow and expansion of the refrigerant. Additionally, the second metering device is configured to prevent refrigerant from flowing from one inside heat exchanger to the other.

The at least one controller is configured to control the vehicular heat pump system. The controller first selects the mode of operation in which the vehicular heat pump system will operate, based on at least one control parameter. The control parameter may include, but is not limited to, ambient air temperature, desired cabin temperature, time, and the like. The controller then controls the direction of refrigerant flow in the refrigeration circuit, based on the mode of operation. When the control parameter is within a first range of temperatures, the vehicular heat pump system will run in a mild cooling mode, and the direction of the refrigerant flow will be from a compressor to an outside heat exchanger. When the control parameter is within a second range of temperatures, the vehicular heat pump system will run in a mild heating mode, and the direction of the refrigerant flow will be from the outside heat exchanger to the compressor. The mass flow rate of the refrigerant is lower in these mild operating modes than in full cooling or heating mode, due to lower demand.

The controller further adjusts the positions of the first isolation valve and the second isolation valve to isolate one of the first inside heat exchanger and the second inside heat exchanger. When the vehicular heat pump system is operating in mild cooling mode, the first isolation valve will be fully open, and the second isolation valve will be fully closed. This will direct the refrigerant to the first inside heat exchanger only, and prevent the refrigerant from flowing to the second inside heat exchanger. When the vehicular heat pump system is operating in mild heating mode, the first isolation valve will be fully closed, and the second isolation valve will be fully open. This will direct the refrigerant flow to the second inside heat exchanger only, and prevent the refrigerant from flowing to the first inside heat exchanger.

The controller further adjusts the positions of the first metering device and the second metering device to further isolate one of the first inside heat exchanger and the second inside heat exchanger, as well as to control the expansion of the refrigeration. In both the mild cooling mode and the mild heating mode, the first metering device will be partially open, regardless of whether it receives the refrigerant from the outside heat exchanger or one of the inside heat exchangers. The second metering device will be fully closed to prevent the refrigerant from flowing from the outlet of one of the inside heat exchangers to the inlet of the other inside heat exchanger.

When the vehicular heat pump system is operating in a heating-based dehumidification mode, which may occur when the at least one control parameter falls between the first range of temperatures and the second range of temperatures, the inside heat exchangers run in series, where the refrigerant flows through the second inside heat exchanger first. As such, the first inside heat exchanger receives the refrigerant at a lower temperature than the second inside heat exchanger.

Because the first inside heat exchanger is used as an evaporator in the mild cooling mode, it may develop condensate, which may flash when switching to the heating-based dehumidification mode. By using only the first inside heat exchanger as the common inside heat exchanger for these two modes, the difference in temperature between the first inside heat exchanger in the mild cooling mode and in the heating-based dehumidification mode will not be as great as that with the second heat exchanger, if it was allowed to also operate in the mild cooling mode. This will reduce the risk of flash fog from occurring in the passenger compartment.

Furthermore, by directing the refrigerant to run through only one inside heat exchanger in both the mild cooling and mild heating modes, which elevates the local refrigerant mass flow rates, there will be improved uniformity of the heat exchanger metal temperature, reducing discharge air temperature spreads.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry and open-ended and any examples of components are non-exhaustive.

Figure 1:
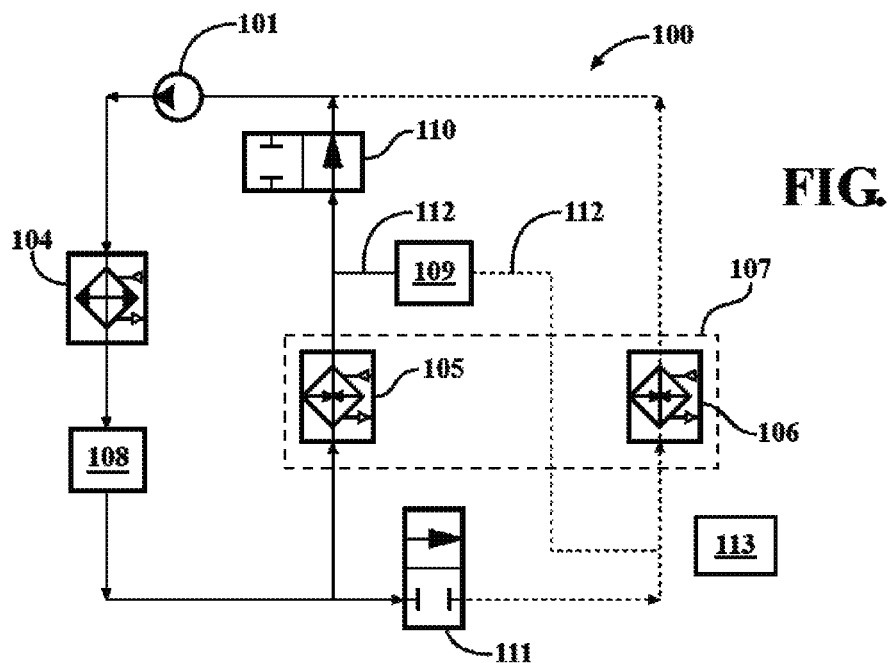
FIG. 1 is a schematic diagram of a vehicular heat pump system operating in a mild cooling mode.
Figure 2:
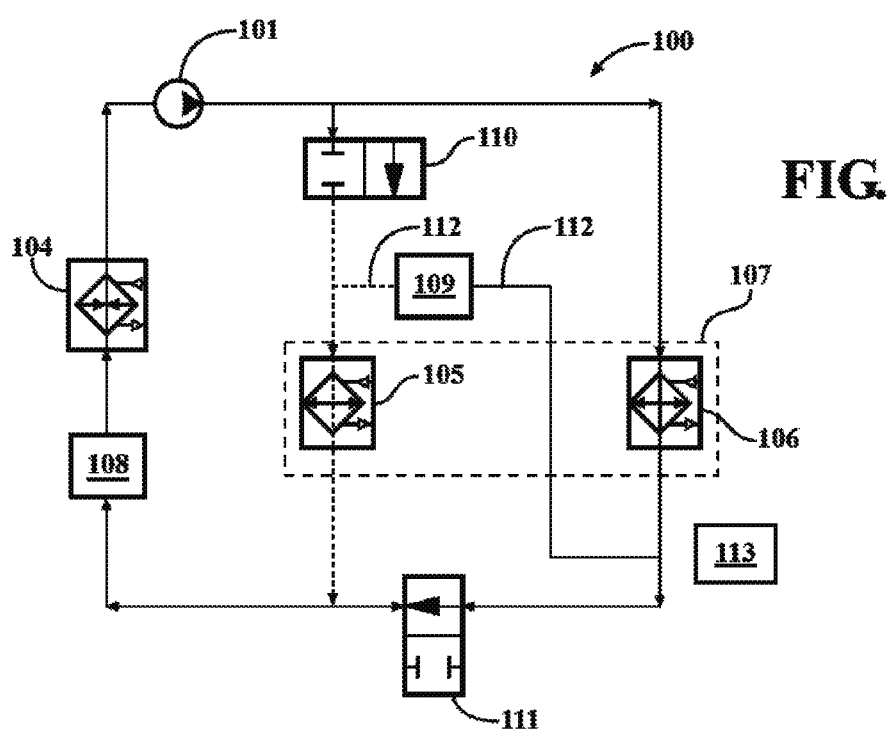
FIG. 2 is a schematic diagram of the vehicular heat pump system of FIG. 1, operating in a mild heating mode.
Figure 3:
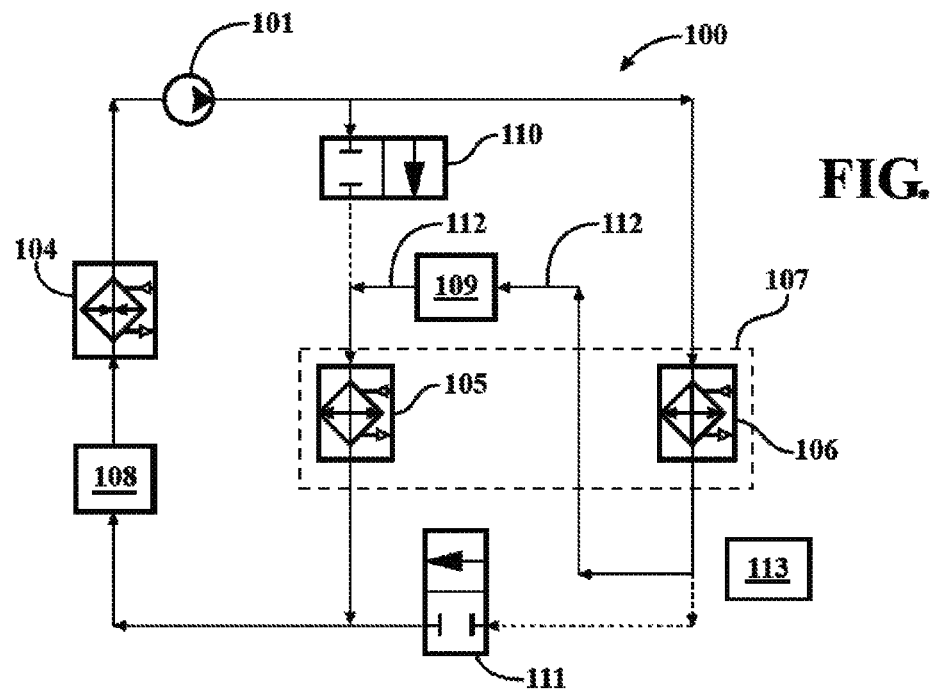
FIG. 3 is a schematic diagram of the vehicular heat pump system of FIG. 1 operating in a heating-based dehumidification mode.

Referring to the drawings, wherein like reference numbers correspond to like or similar components wherever possible throughout the several figures, a vehicular heat pump system 100 for controlling the temperature of a vehicle passenger compartment is shown in FIGS. 1-3. FIG. 1 depicts the vehicular heat pump system 100 operating in a mild cooling mode. FIG. 2 depicts the vehicular heat pump system 100 operating in a mild heating mode. FIG. 3 depicts the vehicular heat pump system 100 operating in a heating-based dehumidification mode. The dashed lines in FIGS. 1 and 2 represent inactive lines in the particular operating mode.

The mode in which the vehicular heat pump system 100 operates may be determined by a number of different control factors and parameters, including, but not limited to, ambient air temperature, the vehicle cabin temperature, the vehicle battery temperature, time, and the like. For example, in one embodiment in which the control parameter is ambient air temperature, the vehicular heat pump system 100 may operate in mild cooling load when the ambient air temperature is between 20 degrees C. to 30 degrees C. When the ambient air temperature drops below 20 degrees C., the vehicular heat pump system 100 may switch into heating-based dehumidification mode, which may range from 5 degrees C. to 20 degrees C. When the ambient air temperature drops below 5 degrees C., the vehicular heat pump system 100 may switch into mild heating mode, which may range from −5 degrees C. to 5 degrees C. When the ambient air temperature is below −5 degrees C. or above 30 degrees C., the vehicular heat pump system may switch into full heating mode or full cooling mode, respectively, neither of which is discussed hereinafter. It should be appreciated that these temperature ranges are exemplary only, and may be any range for each operating mode. In addition, the temperature (or other control parameter) ranges may be adjustable.

The vehicular heat pump system 100 generally may include a compressor 101, an outside heat exchanger 104, a first inside heat exchanger 105, a second inside heat exchanger 106, a first metering device 108, a second metering device 109, a first isolation valve 110, and a second isolation valve 111. The first inside heat exchanger 105 and the second inside heat exchanger 106 may be located inside an HVAC module 107 of the vehicle.

While the first inside heat exchanger 105 and the second inside heat exchanger 106 are shown as two distinct heat exchangers, it should be appreciated that they may be one heat exchanger with coils in different compartments, or any other variations thereof. It should further be appreciated that there may be more than two inside heat exchangers. The heat exchangers 104, 105, and 106 are generally refrigerant-to-air heat exchangers. Depending on the mode of operation, the heat exchangers 104, 105, and 106 may operate as either a condenser or an evaporator, as discussed in more detail hereinafter.

The inside heat exchangers 105 and 106 are generally configured to operate in parallel such that they will receive refrigerant at substantially the same pressure and temperature. However, the inside heat exchangers 105 and 106 may be interconnected by an interconnection line 112, which may allow them to operate in series, as depicted in FIG. 3 and described hereinafter. One end of the interconnection line 112 branches off at the inlet of one of the inside heat exchangers 105 or 106, and the other end of the of the interconnection line 112 branches off at the outlet of the other inside heat exchanger 106 or 105, respectively. There may be a metering device 109 on the interconnection line 112 to control the flow and the expansion of the refrigerant passing through the interconnection line 112.

The metering devices 108 and 109 may be thermal expansion valves (TXV) that may be either electronically or mechanically driven, or any other expansion devices. The isolation valves 110 and 111 may be shut-off valves, flow control valves, or any other valves capable of restricting the flow of refrigerant in a particular line. While a two-position, open/closed valve is depicted in FIGS. 1-3, it should be appreciated that the isolation valves 110 and 111 may be modulating as well.

The vehicular heat pump system 100 may also include a controller 113 configured to control the operation of the vehicular heat pump system 100, according to method 200 depicted in FIG. 4 and described hereinafter. The controller may be electrically connected to the vehicular heat pump system 100 with at least one electrical connection, and may be configured to monitor and control the vehicular heat pump system 100 in the different operating modes. The at least one controller 113 may be configured to communicate with the motor (not shown) which may drive the compressor 101. The at least one controller may further be configured to communicate with the first and second metering devices 108 and 109, the first and second isolation valves 110 and 111, any other ancillary devices, and other subsystems through the at least one electrical connection.

While the vehicular heat pump system 100 generally may include a reversing valve that changes the direction of refrigerant flow when switching operating modes, the reversing valve is not shown in the figures for simplicity purposes. Furthermore, the vehicular heat pump system 100 may further include other components and devices not shown in the figures, including, but not limited to, a coolant heater core, a vehicle battery, and/or additional heat exchangers.

Referring to FIG. 1, the vehicular heat pump system 100 is shown operating in a mild cooling mode in which the refrigerant mass flow rate is lower than in a full cooling mode, due to lower demand. In this mode, the outside heat exchanger 104 operates as a condenser, and the inside heat exchanger 105 operates as an evaporator. The refrigerant flows from the compressor 101 to the outside heat exchanger 104, which condenses the refrigerant to a liquid. The refrigerant then flows through the first metering device 108.

The second isolation valve 111 is in a fully closed state, thereby directing the flow of the refrigerant to the first inside heat exchanger 105 only, and preventing the refrigerant from flowing to the second inside heat exchanger 106. The second metering device 109 is also fully closed to prevent the refrigerant from flowing to the second inside heat exchanger 106 through the interconnection line 112. The first isolation valve 110 is in a fully open state to allow the refrigerant to flow to the compressor 101. Similarly, the first metering device 108 is partially open to allow the refrigerant to flow to the first inside heat exchanger 105 and to control the expansion of the refrigerant.

The second inside heat exchanger 106 is isolated from operating in the mild cooling mode to reduce the risk of flash fog from occurring in the passenger compartment when switching the vehicular heat pump system 100 to a heating-based dehumidification mode, as depicted in FIG. 3.

Referring to FIG. 3, in the heating-based dehumidification mode, the inside heat exchangers 105 and 106 operate in series, where the refrigerant flows through the second inside heat exchanger 106 first. The isolation valves 110 and 111 are fully closed to direct the refrigerant to flow from the second inside heat exchanger 106 to the first inside heat exchanger 105 through the interconnection line 112. The second metering device 109 is only partially open to allow the refrigerant received from the second inside heat exchanger 106 to partially expand to a gaseous and liquid state before entering the first inside heat exchanger 105. As such, the first inside heat exchanger 105 receives the refrigerant at a lower temperature than the refrigerant received at the second inside heat exchanger 106. The first metering device 108 is also only partially open.

Because the first inside heat exchanger 105 is used as an evaporator in the mild cooling mode, it may develop condensate, which may flash when switching to the heating-based dehumidification mode. By using only the first inside heat exchanger 105 as the common inside heat exchanger for these two modes, the difference in temperature between the first inside heat exchanger 105 in the cooling mode and in the heating-based dehumidification mode will not be as great as that with the second heat exchanger 106, if it was allowed to also operate in the mild cooling mode. This will reduce the risk of flash fog from occurring in the passenger compartment, as well as reduce the need to operate an HVAC module blower.

Furthermore, as the refrigerant mass flow rate is lower in this mode, by directing the refrigerant to run through only one inside heat exchanger 105, the local mass flow rate may be elevated. This will improve the uniformity of the heat exchanger metal temperature, thereby reducing discharge air temperature spreads.

Referring to FIG. 2, the heat pump system 100 is shown operating in a mild heating mode in which the refrigerant mass flow rate is lower than in a full heating mode, due to lower demand. In this mode, the outside heat exchanger 104 operates as an evaporator, and the inside heat exchanger 106 operates as a condenser. The refrigerant flows from the outside heat exchanger 104 to the compressor 101.

The first isolation valve 110 is in a fully closed state, thereby directing the flow of the refrigerant to the second inside heat exchanger 106 only, and preventing the refrigerant from flowing to the first inside heat exchanger 105. The second metering device 109 is also fully closed to prevent the refrigerant from flowing to the first inside heat exchanger 105 through the interconnection line 112. The second isolation valve 111 is in a fully open state to allow the refrigerant to flow to the first metering device 108, which is also in a partially open state to allow the refrigerant to flow to the outside heat exchanger 104 and to control the expansion of the refrigerant.

As with the mild cooling mode described above, by directing the refrigerant to run through only one inside heat exchanger 106, there will be improved uniformity of the heat exchanger metal temperature, reducing discharge air temperature spreads.

Figure 4:
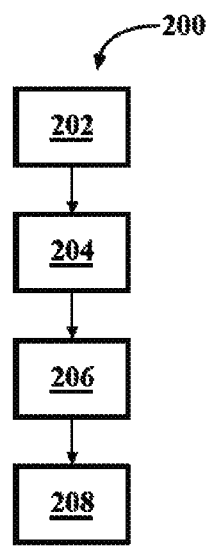
FIG. 4 is a schematic flow diagram illustrating a method of controlling the vehicular heat pump system of FIGS. 1-3.

Referring to FIG. 4, a method 200 of controlling the vehicular heat pump system 100 to reduce the risk of flash fog in the passenger compartment of the vehicle, as well as reduce discharge air temperature spreads, is shown.

Method 200 begins with step 202, in which a mode of operation of the vehicular heat pump system 100 is selected. As explained above, the mode of operation is determined based on at least one parameter, which may include, but is not limited to, ambient air temperature, vehicle cabin temperature, the vehicle battery temperature, time, and the like. When the control parameter is within a first range of temperatures, the vehicular heat pump system 100 may operate in a mild cooling mode. When the control parameter is within a second range of temperatures, the vehicular heat pump system 100 may operate in a mild heating mode.

After step 202, method 200 proceeds to step 204. At step 204, the direction of the refrigerant flow is controlled, based on the mode of operation. As explained above, in cooling mode, the refrigerant may flow from the compressor 101 to the outside heat exchanger 104. In heating mode, the refrigerant may flow from the outside heat exchanger 104 to the compressor 101.

After step 204, method 200 proceeds to step 206. At step 206, the first isolation valve 110 and the second isolation valve 111 are adjusted, based on the mode of operation, to isolate one of the first inside heat exchanger 105 and the second inside heat exchanger 106 from the refrigeration circuit. When the vehicular heat pump system 100 is operating in mild cooling mode, the first isolation valve 110 may be in a fully open position, and the second isolation valve 111 may be in a fully closed position, thereby allowing the refrigerant to flow from the first inside heat exchanger 105 to the compressor 101, and blocking the flow of the refrigerant to the second inside heat exchanger 106.

Conversely, when the vehicular heat pump system 100 is operating in mild heating mode, the first isolation valve 110 may be in a fully closed position, and the second isolation valve 111 may be in a fully open position, thereby allowing the refrigerant to flow from the compressor 101 to the second heat exchanger 106, and blocking the refrigerant from flowing to the first heat exchanger 105.

After step 206, method 200 proceeds to step 208. At step 208, the first metering device 108 and the second metering device 109 are adjusted, based on the mode of operation, to isolate one of the first inside heat exchanger 105 and the second inside heat exchanger 106 from the refrigeration circuit, as well as to control the expansion of the refrigerant. In both mild cooling mode and mild heating mode, the first metering device 108 may be partially open, and the second metering device 109 may be fully closed to prevent refrigerant from flowing between the inlets and outlets of the first and second inside heat exchangers 105 and 106 through the interconnection line 112.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a vehicular heat pump system having multiple heat exchangers within an HVAC module, the vehicular heat pump system including a connection line directly interconnecting a compressor and an outside heat exchanger, the method comprising:
    selecting a mode in which the vehicular heat pump system will operate, based on at least one control parameter;
    controlling the direction of refrigerant flow in a refrigeration circuit of the vehicular heat pump system, based on the mode of operation, wherein the mode of operation is a cooling mode when the at least one control parameter is within a first range of temperatures, and the mode of operation is a heating mode when the at least one control parameter is within a second range of temperatures;
    adjusting a first isolation valve and a second isolation valve of the vehicular heat pump system to isolate one of a first inside heat exchanger and a second inside heat exchanger of the vehicular heat pump system from the refrigeration circuit, based on the mode of operation while still allowing refrigerant flow through the outside heat exchanger disposed along the refrigeration circuit regardless of the mode of operation;
    adjusting a first metering device and a second metering device of the vehicular heat pump system to isolate one of the first inside heat exchanger and the second inside heat exchanger from the refrigeration circuit, and to control expansion of the refrigerant, based on the mode of operation while still allowing refrigerant flow through the outside heat exchanger regardless of the mode of operation; and
    wherein the first inside heat exchanger and the second inside heat exchanger are located within the HVAC module, and are configured to selectively operate both in parallel and in series; and
    wherein controlling the direction of refrigerant flow in the refrigeration circuit of the vehicular heat pump system, based on the mode of operation, includes:
        controlling the direction of refrigerant flow such that the refrigerant flows in a first direction when the vehicular heat pump system is operating in the cooling mode, wherein, when the refrigerant flows in the first direction and the vehicular heat pump system is operating in the cooling mode, the refrigerant exits the compressor, flows through the connection line, and then enters the outside heat exchanger;
        controlling the direction of refrigerant flow such that the refrigerant flows in a second direction when the vehicular heat pump system is operating in the heating mode, wherein the second direction is opposite to the first direction, and when the refrigerant flows in the second direction and the vehicular heat pump system is operating in the heating mode, the refrigerant exits the outside heat exchanger, flows through the connection line, and then enters the compressor; and
        controlling the direction of refrigerant flow such that the refrigerant flows in the second direction when the vehicular heat pump system is operating in a dehumidification mode, wherein when the refrigerant flows in the second direction and the vehicular heat pump system is operating in the dehumidification mode, the refrigerant exits the outside heat exchanger, flows through the connection line, and then enters the compressor.

2. The method of claim 1 wherein the second inside heat exchanger is isolated from the refrigeration circuit when the vehicular heat pump system is operating in the cooling mode.

3. The method of claim 1 wherein the first inside heat exchanger is isolated from the refrigeration circuit when the vehicular heat pump system is operating in the heating mode.

4. The method of claim 1 wherein the at least one control parameter is ambient air temperature.

5. The method of claim 1 wherein the at least one control parameter is a desired temperature of a cabin of the vehicle.

6. A vehicular heat pump system comprising:
    a refrigeration circuit in which refrigerant is circulated, the refrigeration circuit having:
        an outside heat exchanger configured to selectively operate as a condenser or an evaporator;
        a first inside heat exchanger and a second inside heat exchanger each configured to selectively operate as a condenser or an evaporator;
        a compressor configured to compress the refrigerant;
        a connection line coupled between the outside heat exchanger and the compressor, wherein the connection line fluidly interconnects the outside heat exchanger and the compressor;
        at least two isolation valves configured to isolate one of the first inside heat exchanger and the second inside heat exchanger from the refrigeration circuit;
        at least two metering devices configured to control the flow and expansion of the refrigerant; and
        an HVAC module in which the first inside heat exchanger and the second inside heat exchanger are located; and
    at least one controller programmed to:
        select the mode in which the vehicular heat pump system will operate, based on at least one control parameter;

control the direction of refrigerant flow in the refrigeration circuit of the vehicular heat pump system, based on the mode of operation so as to change the direction of refrigerant flow between a first direction and a second direction opposite the first direction, wherein, in the first direction, the refrigerant exits the compressor, flows through the connection line, and then enters the outside heat exchanger, and, in the second direction, the refrigerant exits the outside heat exchanger, flows through the connection line, and then enters the compressor;

adjust the at least two isolation valves to isolate one of the first inside heat exchanger and the second inside heat exchanger from the refrigeration circuit, based on the mode of operation; and adjust the at least two metering devices to isolate one of the inside heat exchangers from receiving refrigerant from the other inside heat exchanger, and to control expansion of the refrigerant, based on the mode of operation;

wherein the first inside heat exchanger and the second inside heat exchanger are configured to selectively operate in parallel and in series; and wherein the controller is programmed to control the direction of refrigerant flow in the refrigeration circuit such that:

the refrigerant flows in the first direction when the vehicular heat pump system is operating in a cooling mode;

the refrigerant flows in the second direction when the vehicular heat pump system is operating in a heating mode; and the refrigerant flows in the second direction when the vehicular heat pump system is operating in a dehumidification mode.

7. The vehicular heat pump system of claim 6 wherein the mode of operation is a cooling mode when the at least one control parameter is within a first range of temperatures.

8. The vehicular heat pump system of claim 7 wherein the connection line has a first end and a second end opposite the first end, the first end of the connection line is directly connected to the outside heat exchanger, the second end of the connection line is directly connected to the compressor, and the refrigerant is directed to flow from the compressor to the outside heat exchanger via the connection line when the vehicular heat pump system is operating in the cooling mode.

9. The vehicular heat pump system of claim 7 wherein the second inside heat exchanger is isolated from the refrigeration circuit when the vehicular heat pump system is operating in the cooling mode.

10. The vehicular heat pump system of claim 7 wherein the mode of operation is a heating mode when the at least one control parameter is within a second range of temperatures.

11. The vehicular heat pump system of claim 10 wherein the connection line is directly connected to the outside heat exchanger, the connection line is directly connected to the compressor, and the refrigerant is directed to flow from the outside heat exchanger to the compressor through the connection line when the vehicular heat pump system is operating in the heating mode.

12. The vehicular heat pump system of claim 10 wherein the first inside heat exchanger is isolated from the refrigeration circuit when the vehicular heat pump system is operating in the heating mode.

13. The vehicular heat pump system of claim 6 wherein the at least one control parameter is ambient air temperature.

14. The vehicular heat pump system of claim 6 wherein the at least one control parameter is a desired temperature of a cabin of the vehicle.

* * * * *